(No Model.)
J. S. JOHNSTON.
PHOTOGRAPHIC CAMERA.
No. 350,682. Patented Oct. 12, 1886.
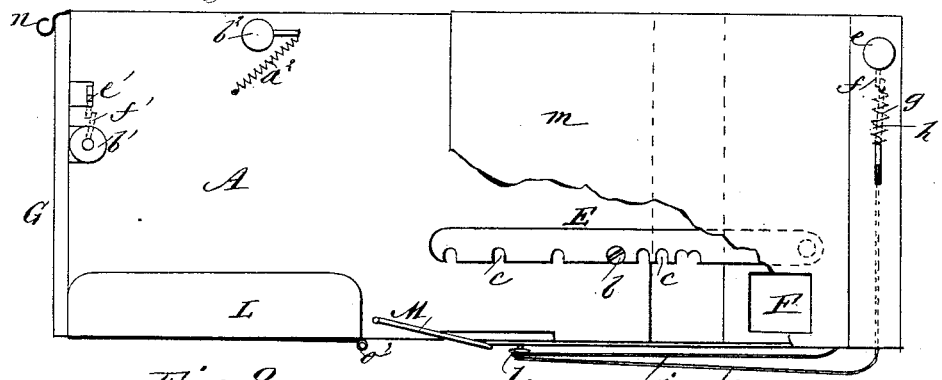
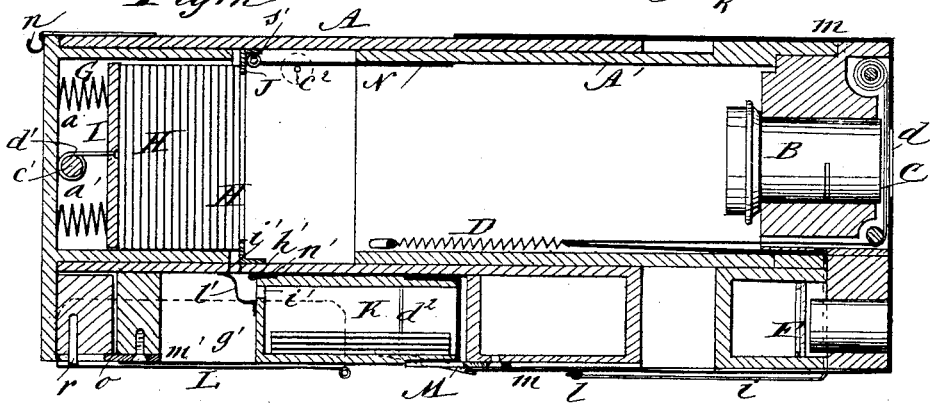
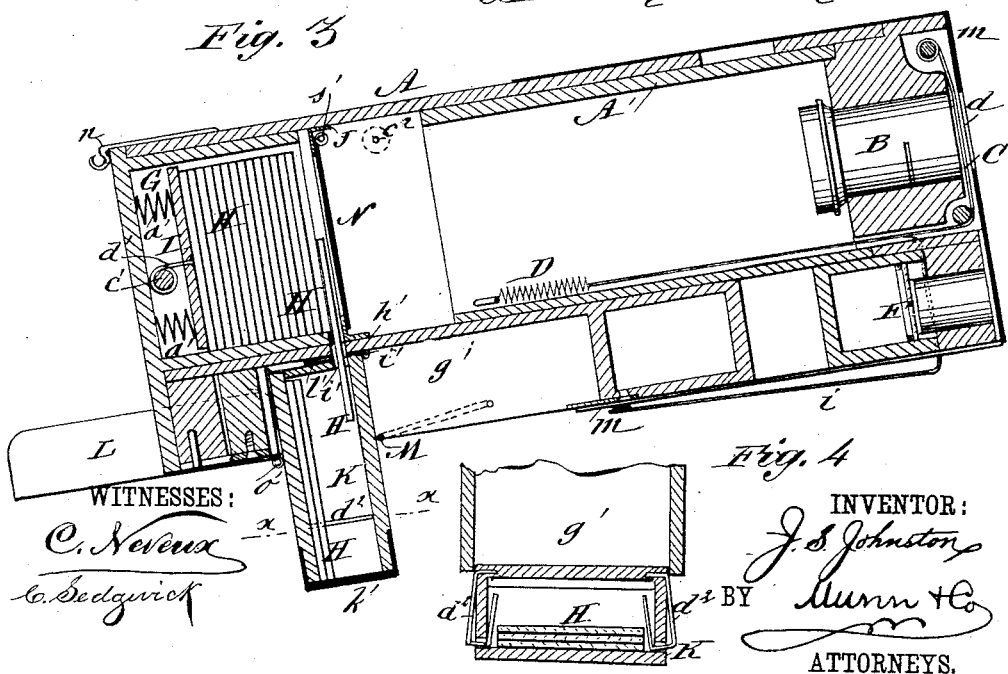
WITNESSES:
C. Neveux
C. Sedgwick
INVENTOR:
J. S. Johnston
BY Munn & Co
ATTORNEYS.

UNITED STATES PATENT OFFICE.

JOHN S. JOHNSTON, OF NEW YORK, N. Y.

PHOTOGRAPHIC CAMERA.

SPECIFICATION forming part of Letters Patent No. 350,682, dated October 12, 1886.

Application filed June 6, 1885. Serial No. 167,893. (No model.)

*To all whom it may concern:*

Be it known that I, JOHN S. JOHNSTON, of the city, county, and State of New York, have invented certain new and useful Improvements in Photographic Cameras, of which the following is a full, clear, and exact description.

This invention more particularly relates to that description of photographic cameras which admit of a series of photographic pictures on detached sheets or plates being taken in succession without necessitating the use of any or separate plate-holders, thus facilitating the use of the camera as a portable one.

The objects of the invention are to improve the construction and manipulation of such cameras, and to provide for the exclusion from exposure to light of the sensitive plates carried by the camera in or during the manipulation of the instrument.

To these and other ends the invention consists in a plate-reservoir camera, substantially as hereinafter described, and in which the sensitive plates are automatically fed up in succession, and after receiving their impressions are automatically deposited in a receiving-reservoir. Such camera will be found very useful for detective and instantaneous photographic purposes; but it may be mounted on a stand and be otherwise employed.

Reference is to be had to the accompanying drawings, forming part of this specification, in which similar letters of reference indicate corresponding parts in all the figures.

Figure 1 represents a partly-broken side view of a portable camera embodying my invention, and Figs. 2 and 3 vertical longitudinal elevations of said camera at different points or stages in its manipulation. Fig. 4 is a transverse section, on the line $x\ x$ in Fig. 3, through the receiving-reservoir of the impressed plates, showing the same as in the act of being closed within the main box of the camera.

The case or main box of the camera is constructed of two box-sections, A A', fitted to slide or enter the one within or over the other, the front sliding section, A', carrying the lens or lens-tube B and front shutter, C, which latter, as here shown, is a perforated band—one of the roller description—controlled by a spring, D, but which may be of any other suitable description for taking either instantaneous or time photographs.

The instrument is focused by adjusting the front box-section, A', in or out, which section may carry a graduated notched pivoted bar, E, adjustable from the exterior, and engaging with a stud, $b$, on the section A of the case, to adapt the instrument to operate at prescribed distances, and which will be determined by the particular notch $c$ of the bar that is made to engage with the stud. A finder, F, having a lens of any suitable description may or may not be used in connection with the instrument for positioning the image, as in other cameras.

When a perforated band roller shutter, C, is used, it may be wound up or adjusted relatively to the aperture $d$ in front of the case, and as against the tension of the spring D, by turning an outside knob, $e$, attached to the one roller of the perforated band-shutter, until an arm, $f$, on said roller or knob is arrested by a sliding holder, $g$, thrown up by a spring, $h$. This holds the shutter with a closed exposure between the lens-tube B and the light inlet or aperture $d$. Cords $i\ k$ are attached at their one end, the one to the spring D and the other to the holder $g$, and at their other end to a button, $l$, which may be fast on a rubber covering, $m$, on the exterior of the case. By pulling back on the cord $k$ the holder $g$ is depressed to admit of the arm $f$ on the roller of the shutter rotating in common with the roller when winding up the shutter, and on releasing hold of the said cord the spring $h$ throws up the holder to engage with the arm $f$ to arrest and hold the shutter at its proper place. The cord $i$ may also be pulled upon to ease the tension of the spring when winding up the shutter. When required to make an exposure, then the cord $k$ is drawn up to depress the holder $g$, which will cause the spring D to rapidly operate the perforated band-shutter C, unless it be required to take a time instead of an instantaneous picture, when the operation of the spring D may be checked and the shutter C be made to move slowly or be adjusted as required, either by holding on the cord $i$ or by manipulating the knob $e$.

The rear or box part, A, of the case is fitted with a sensitive-plate reservoir, G, that may be slid in and out of said box-section A from its back end, and when in place be secured by a spring-catch, $n$, and pivoted hook-catch $o$, attached to the box-section A, and engaging, respectively, directly and by pin $r$, with the reservoir G. This reservoir is of sufficient capacity to contain freely but snugly within it a series consisting of any number of sensitive plates H, arranged one in front of the other and in front of a follower, I, which serves, when the reservoir is in its place, to force the front one of the plates H up against an open-centered frame, J, by the action of springs $a'$. The sensitive plates H are made opaque to prevent light from passing through the front or exposed plate to the others in rear of it. This, when the plates are made of glass, may be done by backing each plate having the sensitive material on its face with black or dark colored paper secured by mucilage having glycerine mixed with it to provide for the ready removal of the backing when developing the negative.

To insert the plates H in the reservoir G, said reservoir is withdrawn from the section A of the case and the follower I drawn and held back by turning a button, $b'$, on the outside end of a roller, $c'$, which is connected with the follower by a cord, $d'$, and by adjusting a catch, $e'$, to engage with a pin, $f'$, on the roller; or any other suitable holding device may be used. This of course compresses the springs $a'$. The reservoir G, charged with plates, is then returned to the section A of the case and secured. The reservoir G, for the purpose of distinction, may be called the "primary reservoir."

Beneath the section A of the case, and fitted to work in a cavity or chamber, $g'$, is a secondary reservoir, K, which is hinged, as at $h'$, to the under side of the case-section A, so as to shut up within the chamber $g'$, as shown in Fig. 2, or be turned outward and downward, as shown in Fig. 3. This secondary reservoir forms a receptacle for each plate in succession after the impression has been taken, and when receiving an impressed plate it is adjusted into the position shown in Fig. 3, in order that the plate may drop from the primary reservoir G through a slot, $i'$, into the secondary reservoir K, as shown in Fig. 3. This slot is made in part through the bottom of the case-section A and in part through the back end of the reservoir K, and forms a continuous slot when said reservoir is turned down. A removable cap, $k'$, is fitted on the free end of the reservoir K, for removing the negatives when required. To prevent light from entering the case-section A and primary reservoir G by the chamber $g'$, in which the secondary reservoir K works, and through the slot $i'$, a flexible hinge-covering, $l'$, arranged to close the slot $i'$ when the reservoir K is closed, as in Fig. 2, out of receiving position, is attached to said reservoir K and section A. Other flexible coverings, $m'$ $n'$, also are or may be attached to the reservoir K and case-section A or its frame, to further exclude light from entering by the chamber $g'$, both when the reservoir K is shut up and let down; also, a trough-like slide, L, hinged, as at $o'$, to the back or under side of the reservoir K, and embracing the sides of the lower frame portion of the section A within it, and running backward, is provided for the more perfect exclusion of the light from the interior of the case-section A and reservoir G by the slot or passage $i'$.

M is a bail-like stop for holding the reservoir K in position when turned down into a receiving position.

N is a back shutter, pivoted at its upper end, as at $s'$, within the case-section A, and arranged, when shut down, to close the face of the opening in the frame J. It is or may be kept closed by a spring, $a^2$, applied to its pivot, or to an outside button, $b^2$, on the end thereof, and that serves to provide for the opening or raising of said shutter, a sliding or any other suitable stop, $c^2$, serving to hold said shutter raised and to provide for its release when required.

From the foregoing description it will be seen that all light is excluded from entering the camera otherwise than by the lens-tube B when uncovered by the front shutter, C, for the purpose.

To use the instrument, the primary reservoir G, charged with plates, being in its place, with the front plate, H, therein forced against the back of the frame J by the liberated springs $a'$, and the secondary reservoir K being raised or closed within the chamber $g'$, the back shutter, N, is closed and the front section, A', of the case set or adjusted to focus, as required, also the front shutter, C, wound up and caught to exclude light from the lens tube B. All preparations now having been made to take the negative, the back shutter, N, is raised and caught and the trigger or sliding holder $g$ drawn down or released from its hold on the front shutter, C, which then is operated by the spring D to expose the front plate, H, in the reservoir G to the image, after which the back shutter, N, is again closed. The apparatus is then slightly tilted, so as to lower its back end, and the knob $b'$ manipulated to slightly draw back the follower I sufficiently to relieve the impressed front plate, H, in the reservoir G from pressure against the frame J, and the secondary reservoir K turned down to receive said plate, which then drops through the slot $i'$ into the secondary reservoir, and by the inclination of the apparatus settles in or against the back of the reservoir K. To take a succeeding negative, the reservoir K is again shut up within the chamber $g'$ and the operation of the apparatus generally repeated, as before, and so on for any number of negatives in succession, by the sensitive plates in the primary reservoir being brought up successively against the frame J, and as the impressions are taken deposited in the secondary reservoir K, one in advance of the other, and from which they may be removed for development as required. The reservoirs G and K should be of such an area as to hold the plates snugly but freely within them. To prevent the impressed plates or negatives deposited in the reservoir K from being injured by abrasion with one another, said reservoir may be provided with one or more side spring-holders, $d^2$, that when the reservoir is shut up within the chamber $g'$ will be forced inward by the walls of said chamber, and so caused to press laterally against the accumulated negatives to restrain them from rattling or motion.

The whole apparatus forms a repeating reservoir camera which is largely automatic and dispenses with plate-holders.

Having thus described my invention, I claim as new and desire to secure by Letters Patent—

1. In a photographic camera having a repeating action, as described, the combination, with the rear plate-holding reservoir, G, the open central frame, J, a shutter adapted to expose and close the opening in said frame, and the negative-receiving reservoir or receptacle arranged below the front end portion of the plate-holding reservoir G, and in communication therewith by a forward passage, $i'$, of the spring-follower I within the reservoir G, whereby the plates are automatically and successively forced and fed up to their place against the open-centered frame, substantially as specified.

2. The combination, with the camera-case, of the plate-holding primary reservoir G, the follower I, the springs $a'$, for automatically forcing up or forward said follower, means, substantially as described, for drawing back the follower, the open-centered frame J, the shutter N, and the hinged or swinging secondary lower reservoir, K, in communication, when swung down or out, by a passage, $i'$, with camera-case in rear of the frame J, substantially as and for the purposes herein set forth.

3. The sliding sections A A' of the camera-case, the front one of which is provided with a lens-tube, B, and a front shutter exposing and closing the opening to said lens, in combination with the primary plate-holding reservoir G in the rear section of said case, the spring-follower I, and the hinged or swinging lower negative-holding reservoir, K, in communication by a plate-passage, $i'$, with the rear case-section, essentially as described.

4. The case-section A and secondary swinging reservoir K, provided with a communicating passage, $i'$, in combination with the primary reservoir G, the open-centered frame J, the flexible covering $l'$, and the lower closing-slide, L, substantially as specified.

5. The flexible coverings $l'$ $m'$ $n'$, in combination with the hinged or swinging reservoir K and the case-section A, having a plate opening or passage, $i'$, between them, essentially as described.

6. The combination, with the case-section A, having a chamber, $g'$, of the negative-holding reservoir K, adjustable in relation with said chamber, as described, and one or more spring-holders for retaining the negatives at rest within said reservoir, substantially as specified.

JOHN S. JOHNSTON.

Witnesses:
 A. GREGORY,
 JAMES M. HENLEY.